United States Patent [19]

Martin

[11] Patent Number: 5,564,064
[45] Date of Patent: Oct. 8, 1996

[54] INTEGRAL POROUS-CORE METAL BODIES AND IN SITU METHOD OF MANUFACTURE THEREOF

[75] Inventor: Ricky L. Martin, St. Peters, Mo.

[73] Assignee: McDonnell Douglas Corporation, St. Louis, Mo.

[21] Appl. No.: 383,192

[22] Filed: Feb. 3, 1995

[51] Int. Cl.⁶ ........................................ B22F 7/04
[52] U.S. Cl. ........................ 419/5; 419/8; 419/28; 419/29; 419/49; 419/50; 29/527.1; 29/530; 428/550; 428/554
[58] Field of Search ............... 419/5, 8, 28, 29, 419/49, 50; 29/527.1, 530; 428/550, 553, 554

[56] References Cited

U.S. PATENT DOCUMENTS

| | | | |
|---|---|---|---|
| 2,751,289 | 6/1956 | Elliott | 75/20 |
| 2,935,396 | 5/1960 | Pashak | 75/20 |
| 3,087,807 | 4/1963 | Allen et al. | 75/20 |
| 3,135,044 | 6/1964 | Mote, Jr. et al. | 29/423 |
| 3,171,195 | 3/1965 | Darling | 29/420.5 |
| 3,184,840 | 5/1965 | Byrne et al. | 29/420.5 |
| 4,077,109 | 3/1978 | Larson | 29/420 |
| 4,099,961 | 7/1978 | Patten | 75/20 |
| 4,137,616 | 2/1979 | Veitl et al. | 29/19 |
| 4,434,930 | 3/1984 | Trenkler et al. | 228/118 |
| 4,538,756 | 9/1985 | Trenkler et al. | 228/118 |
| 4,659,546 | 4/1987 | Kearns | 419/2 |
| 4,820,355 | 4/1989 | Bampton | 148/11.5 A |
| 5,075,286 | 12/1991 | Powell et al. | 505/1 |
| 5,181,549 | 1/1993 | Shapovalov | 164/79 |
| 5,289,965 | 3/1994 | Yasui et al. | 228/157 |
| 5,323,953 | 6/1994 | Adderley et al. | 228/157 |

*Primary Examiner*—Charles T. Jordan
*Assistant Examiner*—Daniel Jenkins
*Attorney, Agent, or Firm*—Bryan Cave, LLP

[57] ABSTRACT

A method for forming a gas-filled consolidated metal billet, involving preparing a metallic shell container, filling the shell with a metal core material and pressurized gas, and consolidating the shell and its contents to form the billet. The consolidated billet is further formed in the same manner as solid metal components by conventional wrought mill working technologies. After thus forming a shaped billet having a predetermined, desired geometry, it is subjected to a heat treatment that expands the gas trapped within the core, to produce in situ a metal body having an integral sandwich-type structure with a solid metal facing and a porous metal core.

11 Claims, 4 Drawing Sheets

2A  2B  2C  2C  2E  2F  2G

INTEGRAL POROUS-CORE METAL BODIES AND IN SITU METHOD OF MANUFACTURE THEREOF

BACKGROUND OF THE INVENTION

This invention relates to a method of making metal bodies having the desirable characteristics of a conventional sandwich structure. More particularly, it relates to a method of making metal bodies having integral lightweight, porous metal cores and solid metal facings, that possess the advantages of both conventional solid wrought metal and sandwich metal structures.

Many structural uses of metal benefit from light weight. For example, industries especially benefitting from lightweight metal structures include the space industry, aircraft industry, ship building industry, the medical implant aspect of the health care industry, as well as commercial industries using porous materials for, e.g., filtration, heat exchangers, chemical cells, heat pipes, and pumps. Because of this need for lightweight metal materials, it has long been sought to develop new lightweight variants of known structural metallic elements through the use of composite materials and innovative structural designs.

For example, composites have involved the combination of metallic materials with ceramic particulate, whiskers, and continuous non-metallic fibers, creating certain weight reduction improvements in the resulting metal composite materials. In general, these composite materials suffer from many drawbacks: some are prohibitively costly to produce for many applications; others are not easily formed; and others exhibit incompatibilities between their constituents that limit their structural utility.

Another approach to producing lightweight structural components has been through innovative structural designs. One well-known design is the so-called sandwich structure, involving a pair of face sheets (e.g., solid metal sheeting) with an intermediate and separate core of lightweight material such as sheet-metal "honeycombs," foamed plastics or metals, or the like. Conventionally, such products are formed by producing individual sandwich face sheets in the desired shape, separately producing a lightweight core material, machining the core material in the desired shape, assembling the individual face sheets and core materials, and finally joining the core to the face-sheets by brazing, adhesive bonding, or other conventional joining methods.

This conventional method of forming sandwich structures results in individual components that possess high strength and low weight, due to their solid faces and lightweight cores. Historically, weight reductions of up to about fifty percent are possible with sandwich structures, when compared to solid components used in the same structural applications. Despite such low weight, sandwich structures still have relatively high strength because the bulk of their mass is in their solid outer surfaces, where structural loads are most severe. Therefore, components built from sandwich structures can, like solid metal components, carry high structural loads, withstanding bending, buckling and compression.

While conventional sandwich structures provide the foregoing advantages, they also possess certain disadvantages. Because the conventional methods of forming sandwich structures involve separate construction and bonding of the face sheets and the core material, their manufacture frequently involves higher construction costs when compared to the processing of conventional solid metal structures. In addition, since they are not integrally formed, conventional sandwich structures have lower degrees of structural stability as compared with solid wrought metal components, and may be prone to oxidative attack and delamination of the separate face sheet and core components thereof.

Conventional, solid metal structural components, despite their advantages, such as affordable machining and forming, and increased stability, have their own unique disadvantages. Most notably, solid components have poor weight efficiency in structural applications since the solid mass at the core of the component is not fully utilized to carry load.

The patent literature describes numerous techniques for producing metal structures combining solid and sandwich-type structural elements. For example, methods of forming porous metal foams are described in Elliott U.S. Pat. No. 2,751,289; Pashak U.S. Pat. No. 2,935,396; Allen et al U.S. Pat. No. 3,087,807; and Patten U.S. Pat. No. 4,099,961. Techniques for forming composite homogeneous and sandwich-type metallic products are disclosed in Mote et al U.S. Pat. No. 3,135,044; Darling U.S. Pat. No. 3,171,195; Byrne et al U.S. Pat. No. 3,184,840; Trenkler et al U.S. Pat. Nos. 4,434,930 and 4,538,756; Bampton U.S. Pat. No. 4,820,355; and Yasui et al U.S. Pat. No. 5,289,965. These and other disclosures are subject to various of the disadvantages inherent in both conventional solid and sandwich-type metal structural components, some of which are identified above.

U.S. Pat. No. 4,181,549 to Shapovalov describes a technique for preparing an integral metal product that can have a solid metal facing and internally porous core. The technique involves the casting of a molten metal within a vacuum furnace with the simultaneous injection of hydrogen gas into the molten core to form a solid/gas composite. A eutectic reaction produces a single solid phase plus a gaseous phase rather than two solid phases, the hydrogen being rejected from the melt as the metal solidifies to produce pores in the solidified metal. The resulting porous billets can be subsequently converted to desired shapes by deformation processing.

The foregoing method however is only applicable to the formation of porous products employing metals which do not form hydrides under normal processing conditions. For example, due to deleterious hydride formation with titanium, the method is not useful in the production of sandwich-type titanium structures such as are desired for many applications, e.g., for aircraft airframes.

Moreover, as the porous billet of the Shapovalov technique is formed prior to any desired deformation processing, any such further processing may result in partial collapse or other destruction of the desired internal porosity.

Also, the Shapovalov technique requires melting of the metals used, which can have undesirable effects on the structural integrity of certain metal alloys, further making the Shapovalov technique unsuitable for many applications. For example, in the aerospace industry, aluminum is often desirably alloyed with copper, magnesium or zinc, which alloyed aluminum products have significantly higher strength than pure aluminum. Alloy elements, such as copper, magnesium and zinc, however tend to segregate themselves, if the alloyed metal is permitted to remain in the molten state for more than even several seconds, thus destroying the high strength properties associated with the alloyed metal. Thus, as the Shapovalov technique requires processing of the metal or metal alloy in the liquid state for perhaps several minutes, there is a loss of the enhanced strength of any alloyed metal subjected to the method of Shapovalov.

It is among the objects of the present invention to provide a new method for forming integral metal bodies having solid facing and porous cores, which possess the respective advantages of both conventional sandwich structures and solid structural materials and which are not subject to many of the disadvantages thereof. These and other objects and advantages of this method will be apparent from the following description of preferred embodiments thereof.

SUMMARY OF THE INVENTION

The method of the present invention effects the production of integral metal structures having porous cores, the manufacture of which uniquely combines the processing affordability and structural stability of conventional solid metal with the ultimate weight efficiency of conventional sandwich structure. In accordance with the method, a shell container is initially prepared from a solid metal material, the container is filled with a reactively compatible metal core material and a gas and is thereafter sealed, and the sealed, gas-filled, core-filled shell container is subjected to a heat treatment sufficient to convert the same into a consolidated metal billet in which the gas is trapped within the metal core, without melting the metal shell container or core. The gas-filled, consolidated billet is an intermediate product which is thereafter treated like a solid metal structural component and subjected to further conventional millworking technologies, e.g., deformation-processing, into mill products that may be sectioned and formed to produce a shaped billets having any predetermined desired geometries akin to conventional solid metal, wrought structural elements. Thereafter, the shaped billet is heated to expand the gas trapped in its core to create an internal network of pores or channels and produce in situ a structural porous metal element having an integral sandwich-type structure, which structure is characterized by a low density porous metal core and a solid metal facing.

Rather than constructing a sandwich structure from individual components, the sandwich-type structure produced in accordance with this method is created in situ within an integral metal facing. The metal products thus produced may be processed and formed in the same manner as conventional solid metal products, but ultimately incorporate an in situ-created, sandwich-type structure having all of the advantages, e.g., strength and light weight, of such structures. However, unlike conventional sandwich structures, the sandwich-type products produced by the method of the invention have an integral structure, which obviates problems with corrosive or oxidative intrusion that can cause face sheet delamination in conventional sandwich structure products. The integral nature of the sandwich-type products produced by the method of the invention thus provides the additional advantage of obviating the need for expensive non-destructive inspections (e.g. using conventional, ultrasonic inspection methods) typically required with conventional sandwich structure.

The method of the present invention permits the ultimate production of a wider variety of sandwich-type structure geometries, as well as permits more affordable formation of sandwich-type structures, than is permitted by conventional sandwich structure production methods. Thus, virtually any type of geometry possible by normal wrought metal processing can be produced using the method hereof. For example, while very thin sandwich structure sheets are difficult to produce by conventional sandwich structure methods, they are readily produced by the method of the invention by rolling the intermediate, consolidated metal billets into thin sheets by conventional rolling techniques used with solid metal. Subsequent heat treatment creates in situ an integral sandwich-type structure within the desired geometry, including thin sheet sandwich-type structural products.

Moreover, lower production costs are possible employing the method of the invention, since sandwich-type materials can be produced in batches. For example, a single consolidated metal billet prepared in accordance herewith can be deformation-processed into multiple final components. This contrasts with the high cost of the multiple fabrication, fixturing, and assembly steps for the individual components of a conventional composite metal sandwich structure element.

DESCRIPTION OF THE PREFERRED EMBODIMENTS

Figure 1:
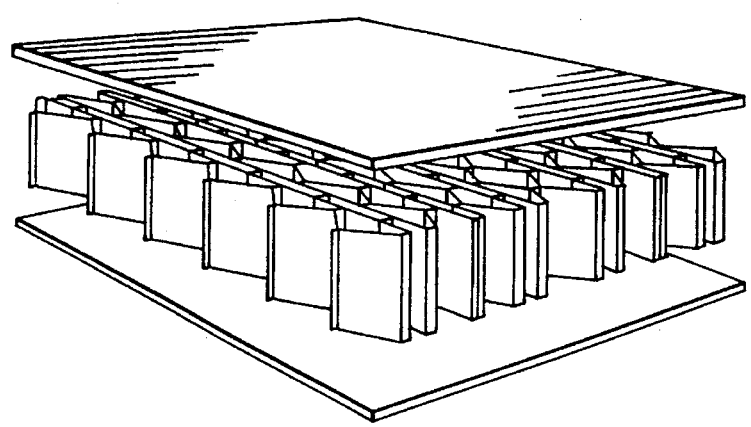
FIG. 1 is a diagrammatic view, in exploded perspective, of a conventional sandwich structure, showing the separately manufactured exterior face sheets and porous, honeycomb nature of the interior core thereof.
Figure 2:
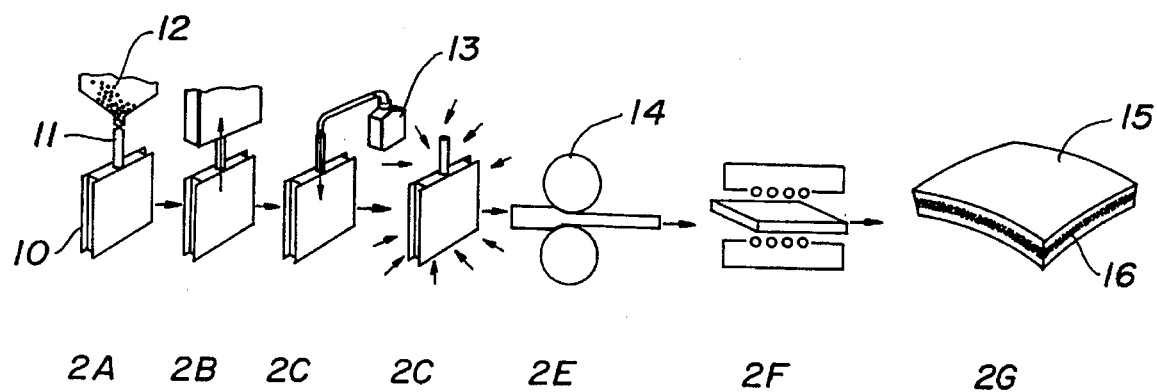
FIG. 2 is a diagrammatic view showing the sequential stages of a preferred embodiment of the method of this invention, utilizing metal particulate to form the core material of the porous metal structure.

The principal steps of a preferred embodiment of the method of the present invention (incorporating metal powder as the core material) are illustrated in FIG. 2. First, in FIG. 2A, a metal shell 10 is prepared, which is fitted with a fill-tube 11, through which a reactively compatible metallic powder 12 is introduced. Then in step FIG. 2B, the powder-filled shell is vacuum-evacuated, followed in FIG. 2C by back-filling the shell with a reactively compatible gas from an appropriate source 13, and final crimping of the shell to seal the powder-filled, gas-impregnated shell. In FIG. 2D, the gas-filled, powder-filled shell is consolidated e.g., by hot isostatic pressing to produce an intermediate consolidated product or billet. In FIG. 2E, the consolidated billet is deformation processed, e.g., by passage through rollers 14. In FIG. 2F, the formed product is subjected to a heat treatment that causes the trapped, internal gas to expand, thus creating in situ a metal body incorporating an integral sandwich-type structure having a solid metal facing 15 and a porous metal core 16, as shown in FIG. 2G.

Figure 3:
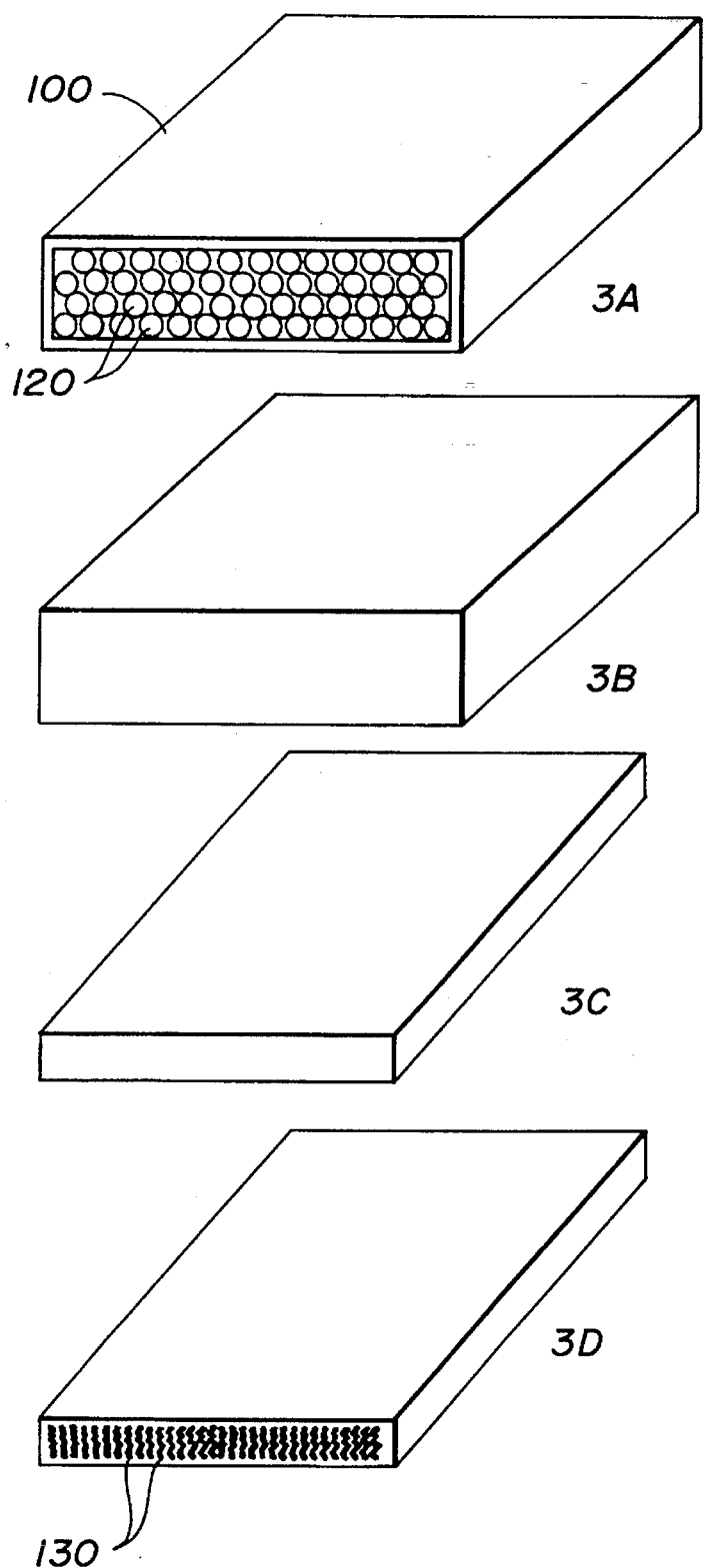
FIG. 3 is a diagrammatic view showing the stages of another preferred embodiment of the present method, partially in section to illustrate the use of metal rods as the core material.

The principal steps of another preferred embodiment of the method (incorporating metal rods as the core material) are illustrated in FIG. 3. Initially, as shown in FIG. 3A, a metal shell 100 is partially constructed, into which metal rods 120 are placed. FIG. 3A shows the shell and core in cross section so that the rods may be seen in the shell. The shell is finished and then the rod-containing shell is vacuum-evacuated and back-filled with a suitable reactively compatible inert gas, and finally sealed in a manner to avoid rupture. In FIG. 3B, the gas-filled and rod-filled shell is shown consolidated into a solid metal billet, e.g., by conventional hot, isostatic pressing. FIG. 3C shows the consolidated metal billet of FIG. 3B after it has been subjected to standard deformation processing, e.g., rolling. FIG. 3D shows a final product in which the core has been expanded through a heat treatment that expands the trapped gas. The final product is shown in cross-section, so as to illustrate the integral sandwich-type structure formed, characterized by continuous pore channels 130 resulting from the use of rods as the initial metal core material.

The metals utilized for the shell containers and core materials employed in the techniques illustrated in FIGS. 2 and 3 may comprise any metal, metal alloy or composite, and may be the same or different, based upon the desired application of the ultimate metal product desired. For example, certain high strength (i.e. structurally strong) metals and metal alloys, which are desirably useful in the aerospace industry, include titanium, aluminum, nickel, as well as alloys thereof such as titanium/aluminum/vanadium, aluminum/copper, and nickel "superalloys." Other metals, not having the same structural strength, of course may be suitable in other applications. The most important factor in choosing the metal and/or metal alloy used respectively for the shell and core, is that each should be "reactively compatible" with the other i.e., one should not interact with the other in such a manner as to adversely affect the properties, e.g., the strength, of the final porous metal product for a given, desired application.

When it is desired to provide the core of the ultimate product in alloy form and the initial core material is in particulate form (as illustrated in FIG. 2), the core material may be provided in the form of an inexpensive blend of the elemental component metal powders in the same weight ratio as in the desired alloy. For example, if a titanium/vanadium/aluminum alloy is desired for the core, a blended mixture of titanium particulate and vanadium/aluminum particulate may be used.

The shell container utilized in the illustrated embodiments may be fabricated from any desired initial stock material, e.g., conventional solid metal mill sheet or other products, and may be fabricated by any conventional metal forming techniques, provided the fabrication results in a shell that has properties and a design adequate for surviving the subsequent forming conditions without rupturing.

As an example, individual sheet metal sections may be welded together to form a desired geometrical shape for the shell. The shell geometry should also be amenable to producing a consolidated billet that can undergo subsequent deformation processing to form any desired structural elements, e.g., cylinders or rectangular plates.

As illustrated in FIGS. 2 and 3, the core material may be in any form that can accommodate the subsequent addition of a reactively compatible gas into the shell, e.g., in particulate form such as shavings, powder or the like, or in discrete forms, as wire, rod, bar, tube, or even as solid billets containing open voids or channels. The form of the initial core metal material is selected based on the nature of the pore structure desired in the final product.

For example, the final pore structure may, desirably, be discrete and cellular in nature for general application stress loads, or continuously channel-like and oriented in a single direction for directionally loaded structural porous metal elements. If continuous rods or tubes are used as the initial core material, the core pore structure (after gas expansion) may incorporate continuous, open channels throughout the length of the final product. Alternatively, use of a particulate metal core material may produce a final pore structure that is generally cellular. Other forms, such as wire, will form their own unique pore structure morphologies.

The method of the invention may be aided by the addition of a "release agent" to the interior interfaces of the initial metal core material. A release agent, in the context of the method of the invention, is any reactively compatible material that will reduce the internal diffusion bonding of the core material, thus facilitating the creation of pores in the core material during the final heat/gas expansion step. Examples of release agents that may be suitable, i.e., reactively compatible, with a particular metal or metal alloy include boron nitride, polytetrafluoroethylene (e.g., as sold under the trademark "TEFLON"®), silica and yttrium oxide. As a further example, boron nitride has been found to be a suitable release agent for use with titanium/vanadium/aluminum alloys, allowing the use of lower temperatures during the final heat/gas expansion step, to yet yield the same degree of expansion.

If added, a release agent is preferably applied so that it does not interfere with the diffusion bonding that takes place between the core metal and the shell container. For example, if tubes are used as the core metal material, only the interior of the tubes typically will be coated with the release agent. As another example, if a block of metal foam is used as the core metal, the foam may be dipped in a slurry of release agent, but then the exterior of the block, which will interface with the shell container, is preferably cleaned of the release agent. If added, a release agent should be of a quantity sufficient to inhibit diffusion bonding in the interior surfaces of the core metal, and to aid in pore formation during the final heat step. Typically useful amounts of release agent will result in coatings on the core metal of only approximately 1 mil.

The pressure-tight shell containing the core material (shown, for example, in FIGS. 2A and 3A) may be vacuum-evacuated if ambient air and moisture are reactive with the particular core and/or shell metals. In general, conventional evacuation pressures of from about $10^{-2}$ to $10^{-5}$ torr may be suitably used for this purpose of eliminating ambient air and moisture. Alternatively, with some metals, ambient air and moisture simply may be displaced with the reactively compatible gas to be used.

A "reactively compatible" gas, i.e., a gas which is substantially unreactive with the core material and shell metals, either during manufacture or use of the structural porous metal product, is thereafter charged into the pressure-tight shell. At the least, any reactivity of the gas must not be such as to have any substantial adverse effect on the strength of the final product. As an example, it is undesirable to utilize hydrogen to form the pore structure of products incorporating titanium because of the formation of hydrides therewith. Reactively compatible gases which may be generally utilized include, e.g., for titanium alloys, the inert gases, e.g. helium and argon. As a further example, nitrogen or even ambient air may be used satisfactorily for aluminum. The gas pressure in the shell container should be high enough that it permits for ready expansion of the core during the final pore-forming heat treatment, yet not so high that it creates undue difficulty during the consolidation step of the method of the invention. Typical gas pressures used with, e.g., a titanium alloy, may range from 1 to 6 atmospheres.

After filling the shell container (preferably, through a fill tube such as illustrated by reference numeral 11 in FIG. 2B), the shell is sealed in any conventional manner, e.g., by crimping, welding or the like, at the juncture of the shell and the fill tube. The sealed shell is then consolidated to form the desired intermediate metal billet (see FIGS. 2D and 3B). As used herein, "consolidating" of the sealed metal shell to form the intermediate billet refers to any conventional technique, e.g., hot compaction in an open die, hot isostatic pressing, or billet compaction in an extrusion press liner, which is sufficient to effect flow and diffusion bonding of the shell container and metal core material to produce a dense, solid product without any permanent pore structure. Conventional techniques for consolidating structural metal products which may be utilized for this purpose, depending on the metal, are described, for example, in the ASM Metals Handbook, Ninth Edition, Volume 7, pp. 295–492, 533–550.

The main requirements for effective consolidation are that the external pressures employed in the consolidation exceed the internal gas pressure of the sealed shell container, and that the temperature used is sufficiently high to effect metal flow and diffusion that will create a metallurgical bond in the core metal, as well as between the core metal and the shell container, however not so high a temperature as to melt the metals. Solid state diffusion bonding is a metal interface phenomenon in which metal surfaces at a suitable elevated temperature, and under sufficient pressure applied to their mating surfaces, undergo a diffusion of the metal atoms across the boundary interface to such an extent that subsequently no interface can be determined.

In the preferred embodiment of the invention, the metals of the core and the shell container never enter the liquid phase, instead remaining in a solid state. The consolidation of titanium metal or titanium alloy billets, for example, may be effected by isostatic pressing at temperatures of from about 1650° to 1800° F., under pressures of from about 10,000 to 25,000 psi, and for periods of from about 1 to 3 hours. The specific conditions utilized for consolidation will of course vary, depending upon the composition of the metal core and shell container materials, the configuration and thicknesses of such components and the particular consolidation technique utilized.

The consolidated billet is thereafter formed into any desired shape by a suitable "deformation processing" operation (see FIGS. 2E and 3C). As used herein, deformation processing refers to any conventional forming operations, e.g., rolling, extruding or forging, which produce a shaped billet having a predetermined, desired geometry. For some metals, such deformation processing also will enhance both metallurgical bonding between the core material constituents and metallurgical bonding between the core and the shell material. Deformation processing of titanium metal or titanium alloy consolidated billets may be effected, for example, by rolling under schedules characterized by from about 5 to 20% reductions per pass, utilizing furnace soaking temperatures of from about 1500° to 1700° F.

The shaped billet is finally subjected to a static heat treatment to produce the desired final structural porous metal product (see FIGS. 2F and 3D). Such treatment expands the gas trapped within the core of the shaped billet and produces in situ a core comprising a permanent metallic pore structure and, integral therewith, a solid metal facing thereon. The heat treatment is carried out at temperatures and for periods of time sufficient to expand the trapped gas in the solid core to form permanent voids or channels therein without melting the metal core material. The heat treatment of titanium metal or titanium alloy shaped billets, for example, may be effected at temperatures of from about 1650° to 2500° F. and for periods of from about 4 to 48 hours. The specific conditions utilized for the heat treatment will of course vary depending upon the particular compositions and configurations of the shaped billets treated.

The resulting structural porous metal body has solid metal surfaces corresponding to the original shell, which are integral with a lightweight, porous metal core. Thus, the method of the invention provides an in situ, sandwich-type structure that provides the structural efficiency, i.e., lightness and strength of a conventional sandwich structure, yet which is formed with the processing and design flexibility of conventional solid wrought metal.

It should be noted that the desired pore structure of the final porous metal body may be developed prior to the deformation processing operation, but it is preferred, as indicated above, to develop the porous core through a final heat treatment step, so as to allow more complex forming operations while the billet is still in the consolidated (i.e., fully dense) state. If the permanent pore structure of the core is formed prior to deformation processing, and the latter step results in any undesired consolidation or destruction of the desired pore structure of the core, the present invention uniquely permits the porous metal body to be subjected to a further heat treatment to redevelop the desired porosity.

The following example is illustrative of one preferred way of carrying out the method of the present invention:

EXAMPLE

A pressure-tight powder canister was manufactured from standard titanium-aluminum-vanadium, Ti-6Al-4 V ("Ti-6-4"), sheet stock. The canister was designed to allow it to be diffusion bonded to the surface of the metal core material during processing, and to later serve as the solid "face sheets" in the final sandwich-type structural porous metal body.

As exemplified in FIG. 2A, the can was fitted with a fill tube, and through it the can was filled with a blend of titanium particulate and aluminum/vanadium particulate, in weight ratios roughly equivalent to the respective weight ratios of the elemental components in standard Ti-6-4 metal alloy sheet stock. The blend was a mixture of pure titanium sponge fines, (a byproduct of titanium sponge production) and an Al-V master alloy particulate, about 90% of which had particle sizes of less than 200 microns, and about 10% of which had particle sizes of from about 100 to 400 microns.

As shown in FIG. 2B, the filled shell canister was then vacuum-evacuated to 10⁻torr. The vacuum-evacuated canister was then backfilled with argon gas to a pressure of 5 atmospheres (FIG. 2C), after which it was sealed by crimping.

The sealed, argon-filled can was then isostatically pressed (FIG. 2D) at 1800° F. and 15,000 psi, for 3 hours, to form an intermediate consolidated, solid metal billet, in which the argon gas was trapped within the consolidated core particles.

The gas-filled, intermediate billet was then rolled to metal sheet measuring 0.125 inches thick, using a standard Ti-6-4 rolling schedule (characterized by 10% reductions per pass, and 1650° F. furnace soaking temperatures), as shown in FIG. 2E.

Figure 4C:
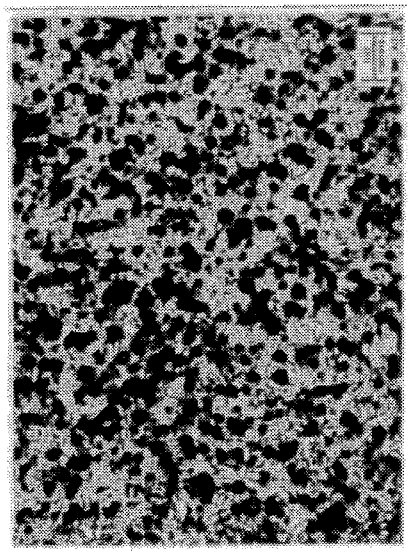
FIG. 4 is a series of photomicrographs showing the metallurgical microstructure of the core material employed in the Example described below, at each of three primary steps: A) as blended elemental powder particulate employed to form the core alloy, prior to consolidation or the core (FIG. 4A); B) after adding gas and consolidation (FIG. 4B); and C) after final heat-treating, effecting gas and core expansion (FIG. 4C).
Figure 4B:
Figure 4A:
Figure 5A:
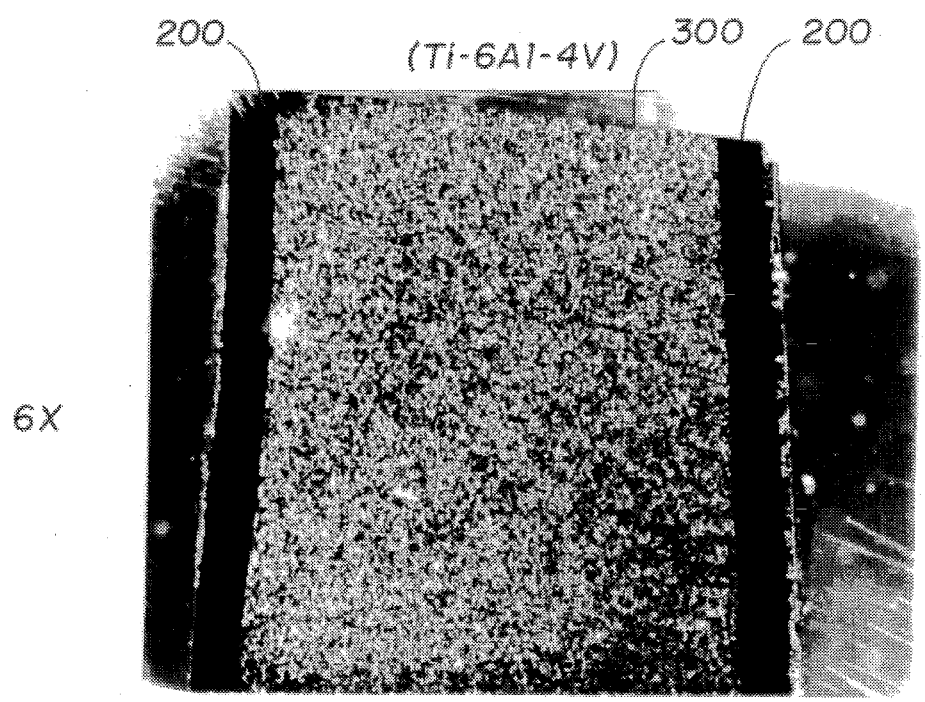
FIG. 5A is a photomicrograph (at 6x magnification) showing a cross-section of the metallurgical microstructure of the final porous metal body produced in the Example.
Figure 5B:
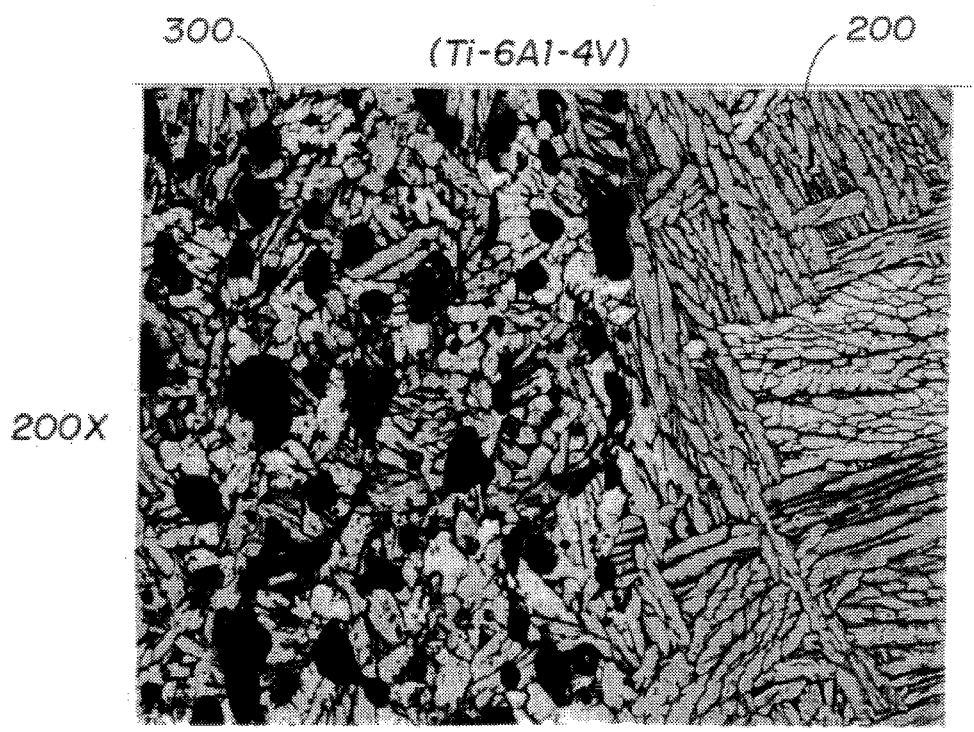
FIG. 5B is a photomicrograph of the same product taken at a higher magnification (200x), showing the continuous metallurgical bond between one of the solid face sheets and the lightweight, porous core thereof.

The resulting metal sheet stock was thereafter sectioned, and heated at 2200° F. for 8 hours (see FIG. 2F) to cause formation of the final structured porous metal body (FIG. 2G). The formation of the porous core, caused by expansion of the argon gas trapped in the consolidated core, resulted in an overall expansion of the metal sheet from 0.125 inch to 0.16 inch in thickness. The final product had a high volume of discrete, generally spherical pores in a homogeneous, fine-grained Ti-6-4 metal alloy matrix, within a solid Ti-6-4 metal facing. The metallurgical microstructures of the core material used/formed in the Example are shown in FIGS. 4A–C, and the bond between the face sheet 200 and the porous core 300 of the final structural porous metal body (see FIG. 2G) is shown in FIGS. 5A and 5B.

In summary, the present process can be used to produce intermediate billets having the form of conventionally useful, wrought metal products, e.g., bar, plate, sheet, or forgings, which can be converted in situ into integral, sandwich-type structural porous metal bodies having enhanced structural stability as compared with conventional sandwich structures. Such products are of particular interest for structural use in airframes, but provide viable lower cost, lightweight alternatives to sandwich structures in many other commercial applications.

As various changes may be made in the preferred embodiments described above without departing from the scope of the present invention, it is intended that the foregoing description should be deemed illustrative rather than limiting.

What is claimed is:

1. A method for preparing a structural metal body having a sandwich structure comprising an integral porous internal metal core and a solid external metal facing, comprising:
   a. preparing an outer shell container from a solid metal material;
   b. filling the shell container with a plurality of internal metal core elements for forming the internal core structure;
   c. filling the core-filled shell container with a gas which is substantially unreactive with the internal metal core elements and the outer shell;
   d. sealing the gas-filled, core-filled shell container;
   e. applying heat and pressure to the sealed container to effect flow and diffusion bonding of the internal metal core elements to one another and to the outer shell, to consolidate the core elements and the shell into a dense, solid metal billet free of any permanent pore structure;
   f. heating and forming the consolidated billet into a shaped billet having a predetermined, desired geometry, to enhance metallurgical bonding between the core metal constituents and between the core and the shell; and
   g. heating the shaped billet to expand the gas trapped in the core and produce in situ the integral sandwich-type structure having a core comprising a permanent porous metallic structure and, integral therewith, a solid metal facing thereon.

2. The method of claim 1, wherein the gas is an inert gas.

3. The method of claim 2, wherein the gas is argon.
4. The method of claim 1, wherein the solid metal material is titanium.
5. The method of claim 1, wherein the solid metal material is a titanium-aluminum-vanadium metal alloy.
6. The method of claim 1, wherein the internal metal core elements comprise a blend of particulate metal powders in a predetermined weight ratio for forming a desired internal metal alloy core, and wherein an internal metal alloy core is formed in step g. having a generally cellular pore structure.
7. The method of claim 1, wherein the internal metal core elements comprises continuous metal rods or tubes, and wherein the core structure is formed in step g. with continuous open channels.
8. The method of claim 1, wherein prior to filling the shell container with the gas, the shell container is vacuum-evacuated.
9. A structural porous metal body prepared by the method of claim 1.
10. A method for preparing a structural metal body having a sandwich structure comprising an integral porous internal metal core and a solid external metal facing, comprising:
    a. preparing an outer shell container from a titanium/aluminum/vanadium metal alloy;
    b. filling the shell container with a blend of elemental particulates of titanium sponge fines and aluminum-vanadium master alloy particulate in the same approximate weight ratio as said titanium/aluminum/vanadium alloy, for forming the internal core structure;
    c. vacuum-evacuating the particulate-filled shell container to a pressure of from approximately $10^{-2}$ to $10^{-5}$ torr;
    d. filling the shell container with argon at a pressure of from approximately 1 to 6 atmospheres;
    e. sealing the gas-filled, core-filled shell container to create a pressure-tight container;
    f. isostatically pressing the sealed, filled shell container at a temperature of from approximately 1650° to 1800° F. and a pressure of from approximately 10,000 to 25,000 psi, for a period of from approximately 1 to 3 hours to effect flow and diffusion bonding of the internal metal core elements to one another and to the outer shell and thereby consolidate the core elements and the shell into a dense, solid metal billet free of any permanent pore structure;
    g. rolling the consolidated metal billet and forming a sheet-like shaped billet using a rolling schedule appropriate for said titanium/aluminum/vanadium alloy, to enhance metallurgical bonding between the core metal constituents and between the core and the shell;
    h. forming the shaped billet into a metal sheet having a predetermined desired geometry; and
    i. heating the formed metal sheet at a temperature from approximately 1650° to 2500° F. for a period of from approximately 4 to 48 hours to expand the gas trapped in the core and produce a formed metal sheet comprising the integral sandwich structure having a core comprising a permanent porous metallic structure and, integral therewith, a solid metal facing thereon.
11. A structural metal body prepared by the method of claim 10.

* * * * *